United States Patent
Blatz

(10) Patent No.: US 7,225,545 B2
(45) Date of Patent: Jun. 5, 2007

(54) POWER TOOL WITH AN ECCENTRICALLY DRIVEN WORKING TOOL

(75) Inventor: Thomas Blatz, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/238,495

(22) Filed: Sep. 28, 2005

(65) Prior Publication Data
US 2006/0064881 A1    Mar. 30, 2006

(30) Foreign Application Priority Data
Sep. 29, 2004    (DE)    ...................... 10 2004 047 280

(51) Int. Cl.
*B27B 9/00*    (2006.01)
(52) U.S. Cl. ................... 30/389; 83/676; 30/390
(58) Field of Classification Search ................ 30/388, 30/389, 390; 83/676; 125/13.1, 13.2, 20
See application file for complete search history.

(56) References Cited

U.S. PATENT DOCUMENTS 4,646,607 A * 3/1987 Johansson ..................... 83/853
4,800,650 A * 1/1989 Johansson ..................... 30/389
6,569,001 B2 * 5/2003 Rudolf et al. ................ 451/344
6,785,971 B2 * 9/2004 McDonnell ................... 30/389

OTHER PUBLICATIONS

Magrab, Edward. Integrated Product and Process Design and Development: The Product Realization Process. CRC Press. © 1997. ISBN 0-8493-8483-4.*

* cited by examiner

Primary Examiner—Kenneth E. Peterson
Assistant Examiner—Sean Michalski
(74) *Attorney, Agent, or Firm*—Abelman, Frayne & Schwab

(57) ABSTRACT

A power tool, in particular a circular saw, for eccentrically a rotatable working tool and, in particular, a circular saw blade, includes a roller device (13) supported on a tool housing (6) and having at least two roller pairs (12, 16) each having a first roller (10, 14) and a second roller (17, 19) engageable with opposite sides of the working tool (4), with at least one of the rollers (10, 14, 17, 19) of at least one roller pair (12, 16) being rotatable by a tool motor (8) which is located in the housing (6), for driving the working tool (4), and a pivot device (20) for pivoting the first rollers (10, 14) together relative to the second rollers (17, 19) between a release position in which the working tool (4) is brought in or removed from the roller device (13), and a drive position in which a forcelocking connection between the at least one of the rollers (10) of the at least one roller pair (12, 16) and the working tool (4) is established.

5 Claims, 4 Drawing Sheets

POWER TOOL WITH AN ECCENTRICALLY DRIVEN WORKING TOOL

BACKGROUND OF THE INVENTION

1. Field of the Invention

The present invention relates to a power tool, in particular, a circular saw with an eccentrically driven working tool, in particular, a circular saw blade. The power tool includes a housing and a motor located in the housing. The power tool further includes a roller device supported on the housing and having at least two roller pairs spaced from each other and each having a first roller and a second roller. The first and second rollers of both roller pairs engage opposite sides of the working tool. At least one of the rollers of at least one roller pair is rotatable by the motor for driving the working tool.

2. Description of the Prior Art

In power tools of the type described above, as a rule, one roller pair is used for driving the working tool, with the working tool being clamped between one roller, which functions as a drive roller, and another, counter-pressure roller. The at least one another roller pair serves for guiding the working tool and for absorption of radial and axial forces generated during operation of the power tool. To this end, the at least one another roller pair has two rollers which function as guide rollers and which are freely rotatable and, during the operation of a power tool, roll over opposite sides of the working tool.

German Publication DE 21 61 489 discloses a power tool with a circular working tool. The tool has a drive roller pair with a drive roller and a counter-pressure roller, with the counter-pressure roller being biased, in different embodiments, with a spring element against the working tool. The tool further includes a guide roller pair, the guide rollers of which are spaced from the drive roller pair and are secured, with a possibility of rotation, on the circular blade housing.

The roller device of this German publication insures a stable guidance of circular working tool, during the operation against axial and radial displacements.

A drawback of the known power tool consists in that with the guide rollers being fixedly secured on the blade housing, wear of the guide rollers, which increases during their service life, cannot be compensated. As a result, the precision of the working tool guidance becomes reduced with time, which reduces the operational life of the tool. In addition, because of the fixed support of the guide rollers, the replacement of the working tool in the known power tool requires a relatively large amount of time and is very elaborate.

Accordingly, an object of the present invention is to provide a power tool of the type described above and in which the above-discussed drawbacks of the known tool are eliminated.

Another object of the present invention is to provide a power tool of the type discussed above and which would insure a rapid and easy replacement of the working tool.

SUMMARY OF THE INVENTION

These and other objects of the present invention, which will become apparent hereinafter, are achieved by providing in the power tool a pivot device for pivoting the first rollers together relative to the second rollers between a release position in which the working tool brought in or removed from the roller device, and a drive position in which a forcelocking connection between the at least one of the rollers of the at least one roller pair and the working tool is established.

By pivoting the first rollers of both or all roller pairs, in case that more than two roller pairs are provided, together, all of the roller pairs open simultaneously, providing for an easy removal or insertion of the working tool. Thereby, a rapid and easy replacement of the working tool is achieved.

According to a particularly advantageous embodiment of the present invention, the pivot device preloads the roller pairs in the drive position. Thereby, compensation of an increase wear during the service life of all of the roller pairs, the rollers of which engage the working tool, is achieved. Thereby, over the entire service life of the roller device, a substantially precise guidance of the working tool is insured, which increases the operational life of the tool.

Advantageously, the pivot device includes a spring arrangement for preloading the roller pairs together. Thereby, additional costs, which are associated with preloading of the roller pairs, can be minimized. In addition, less additional mounting space is necessary.

Alternatively, the roller pairs can be preloaded by separate spring elements. Thereby, the wear of one roller pair can be compensated independently from the wear of another roller pair. Thereby, an almost exact guidance of the working tool during the tool entire service life can be maintained even in the case of different wear of guide rollers and the drive and counter-pressure rollers.

Advantageously, the pivot device has actuation means for bringing the roller pairs together into the release position. Thereby, a particularly comfortable and rapid replacement of the working tool becomes possible.

It is particularly advantageous when the actuation means is retainable in the release position. This further simplifies handling of the working tool replacement.

According to a particularly advantageous embodiment of the present invention, the actuation means is formed as an eccentric lever pivotally supported on the housing. The eccentric lever has a radial cam engageable with at least one support member for supporting either the first rollers or the second rollers and which is pivotally supported on the tool housing. With such an eccentric lever, comfortably, large forces for displacing the roller pairs to their release position can be applied. Moreover, the eccentric lever can be easily retained in a predetermined position with the radial cam.

It is advantageous when the pivot device is provided with a spring for preloading the at least one support member in the drive position, and an engagement cog is rotatably supported on the at least one support member for displacing the spring in its preloading position, with the cog being engageable by the radial cam. Thereby, there is provided a pivot device that insures a stable forcelocking connection between the rollers of the roller pairs and the working tool, while maintaining the manufacturing costs low.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE INVENTION

Figure 1:
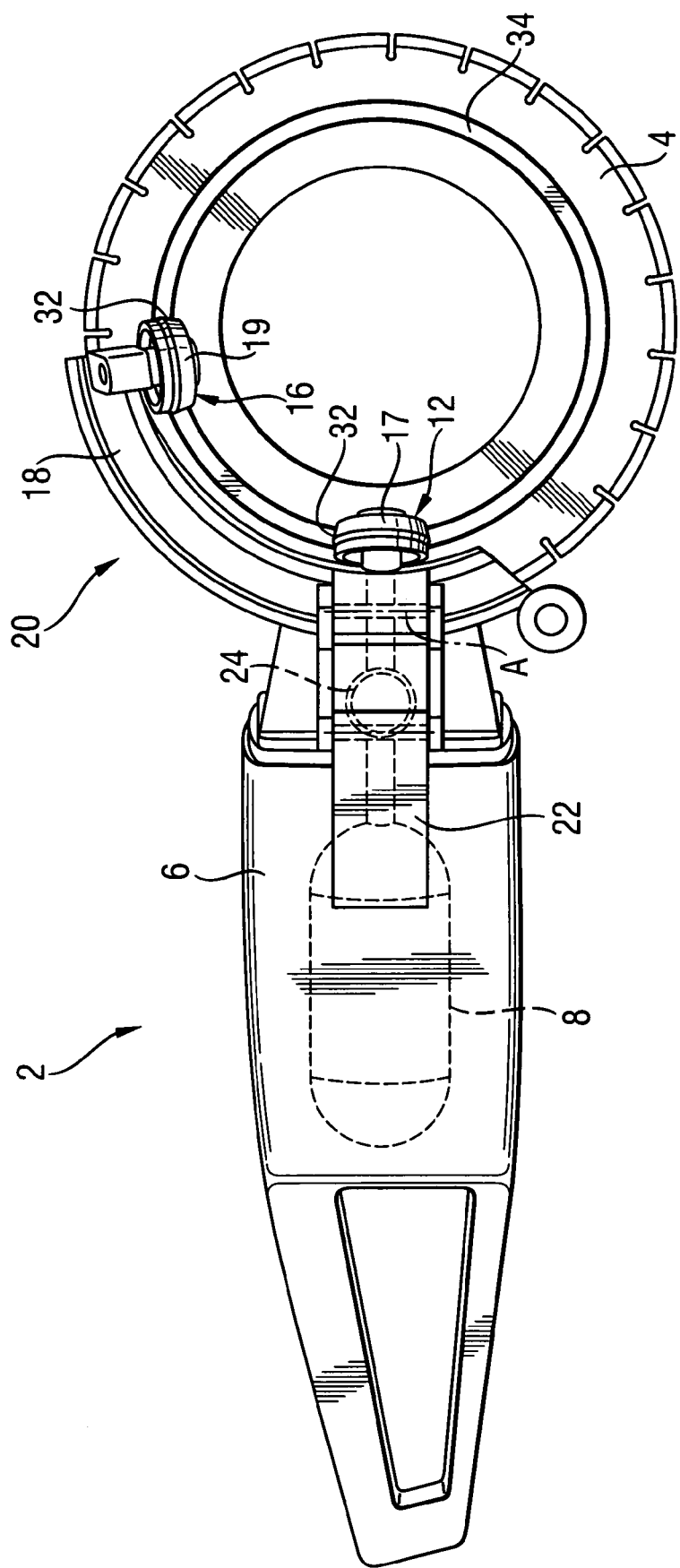
FIG. 1 a plan view of a power tool according to the present invention.

A power tool 2 according to the present invention, which is shown in FIG. 1, is formed as a circular saw with a circular working tool 4 in form of a disc that is eccentrically driven. The power tool 2 includes a housing 6, a motor 8 located in the housing 6 and rotatably connected with a first drive roller 10, which is formed as a friction wheel, of a drive roller pair 12 of a roller device designated generally with a reference numeral 13, as shown in FIG. 2.

Figure 2:
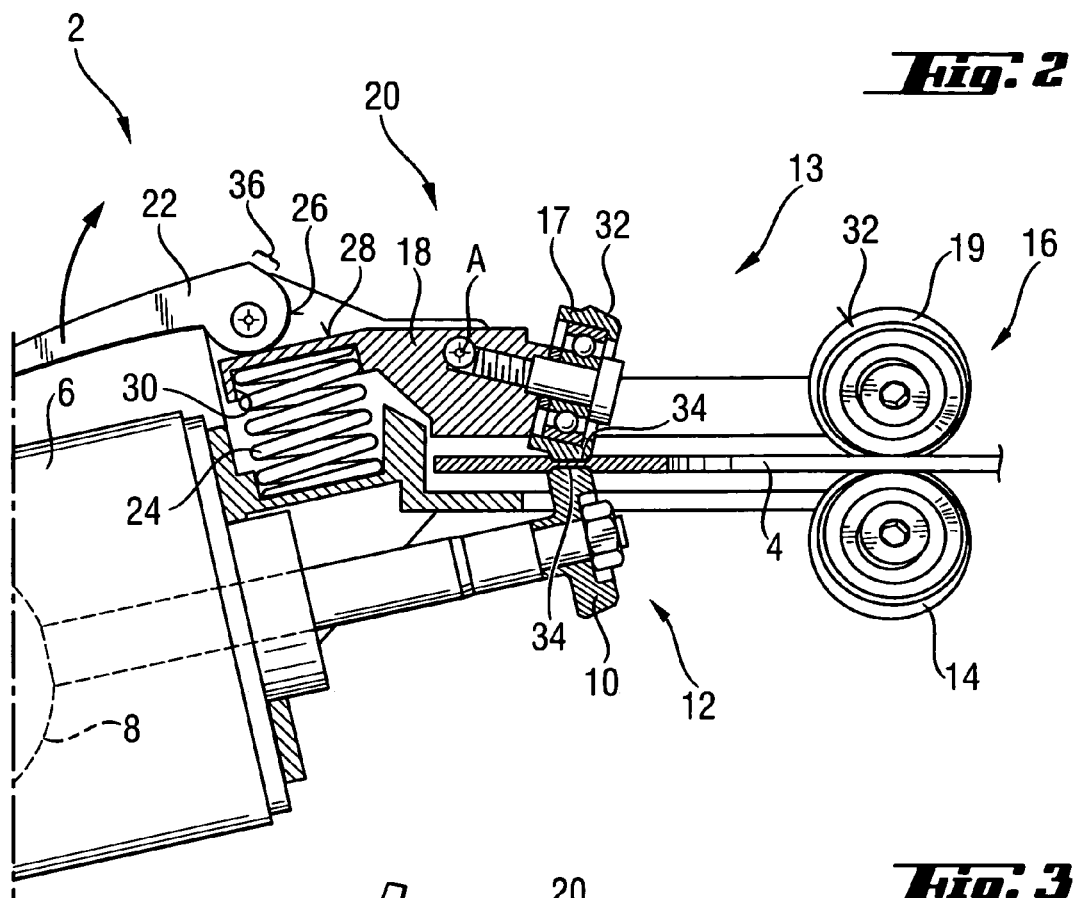
FIG. 2 a partially cross-sectional view of a pivot device of the power tool shown in FIG. 1 in a drive position.
Figure 3:
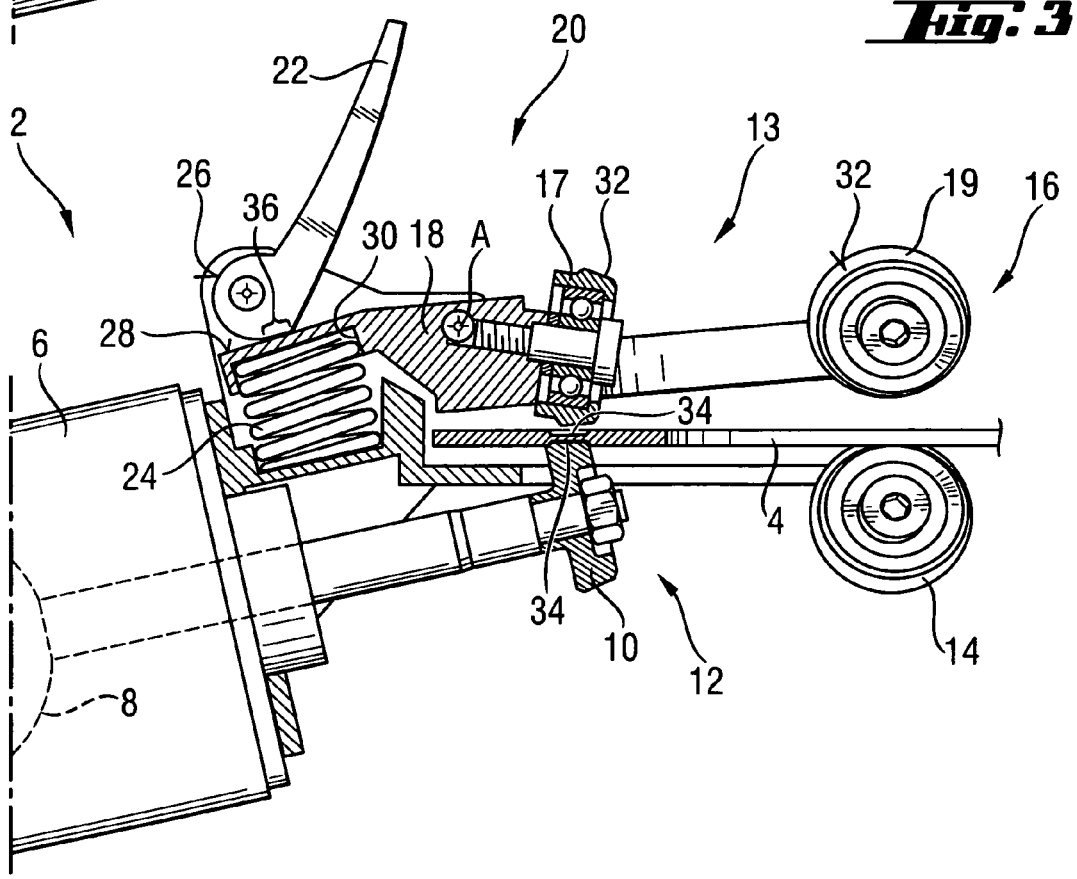
FIG. 3 a partially cross-sectional view of a pivot device of the power tool shown in FIG. 1 in a release position.

As shown in FIGS. 2–3, the first drive roller 10 is supported on the housing 6 in a fixed spaced relationship to a first guide roller 14 of a guide roller pair 16. A second drive roller 17 of the drive roller pair 12, which is formed as a counter-pressure roller cooperating with the first drive roller 10, is rotatably supported, together with a second guide roller 19 of the guide roller pair 16, on a support member 18 of a pivot device 20. The support member 18 is supported on the housing 6 for a pivotal movement about a pivot axis A. The pivot device 20 also includes actuation means 22 in form of an eccentric lever, and a spring element 24, which is formed as a helical spring. With the actuation means 22, a displacement force is applied to the support member 18.

By pivoting the second drive roller 17 of the drive roller pair 12, the working tool 4 can be pressed from one side against the first drive roller 10 which is positioned on the other side of the working tool 4. Thereby, a frictional connection, necessary for transmittal of a rotational movement, is achieved.

As further shown in FIGS. 2–3, the actuation means 22 includes, in a longitudinal direction, a spirally bent radial cam 26 engaging a contact surface 28 of the support member 18. On its side remote from the contact surface 28, the support member 18 has a spring receptacle 30 into which an end of the spring element 24 projects. With its opposite end, the spring element 24 is supported against the housing 6.

FIG. 2 shows the pivot device 20 in a drive position in which the radial cam 26 of the actuation element 22 is spaced by a certain distance from the contact surface 28. In this position, the second rollers 17 and 19, which are supported on the support member 18, are pressed by the spring element 24 in a direction of respective first rollers 10 and 14. In this way, both the drive roller pair 12 and the guide roller pair 16 apply pressure to opposite sides of the working tool 4 which is positioned in a roller device 13.

As shown in FIGS. 1–2, both the drive rollers 10, 17 and the guide rollers 14, 19 have a circumferential profile 32 that engages in a respective one of two circumferential grooves 34 of the working tool 4. In this way, the working tool 4 is secured on the power tool 2 in the drive condition with the roller device 13 both in axial direction and radial direction. Alternatively, a pure forcelocking securing of the working tool 4 is possible.

In order to replace the working tool 4, the actuation element 22 is pivoted into a position shown in FIG. 3. The pivot device 20 assumes a release position in which the radial cam 26 is pressed against the contact surface 28, whereby the support member 18 is pivoted against a biasing force of the spring element 24 about the axis A. As a result the second drive roller 17 and the second guide roller 19 move, respectively, away from the first drive roller 10 and the first guide roller 14. Thereby, both the drive roller pair 12 and the guide roller pair 16 open, and the circumferential profiles 32 disengage from the respective grooves 34, so that the working tool 4 can be removed from the roller device 13 and replaced with another working tool.

Figure 4:
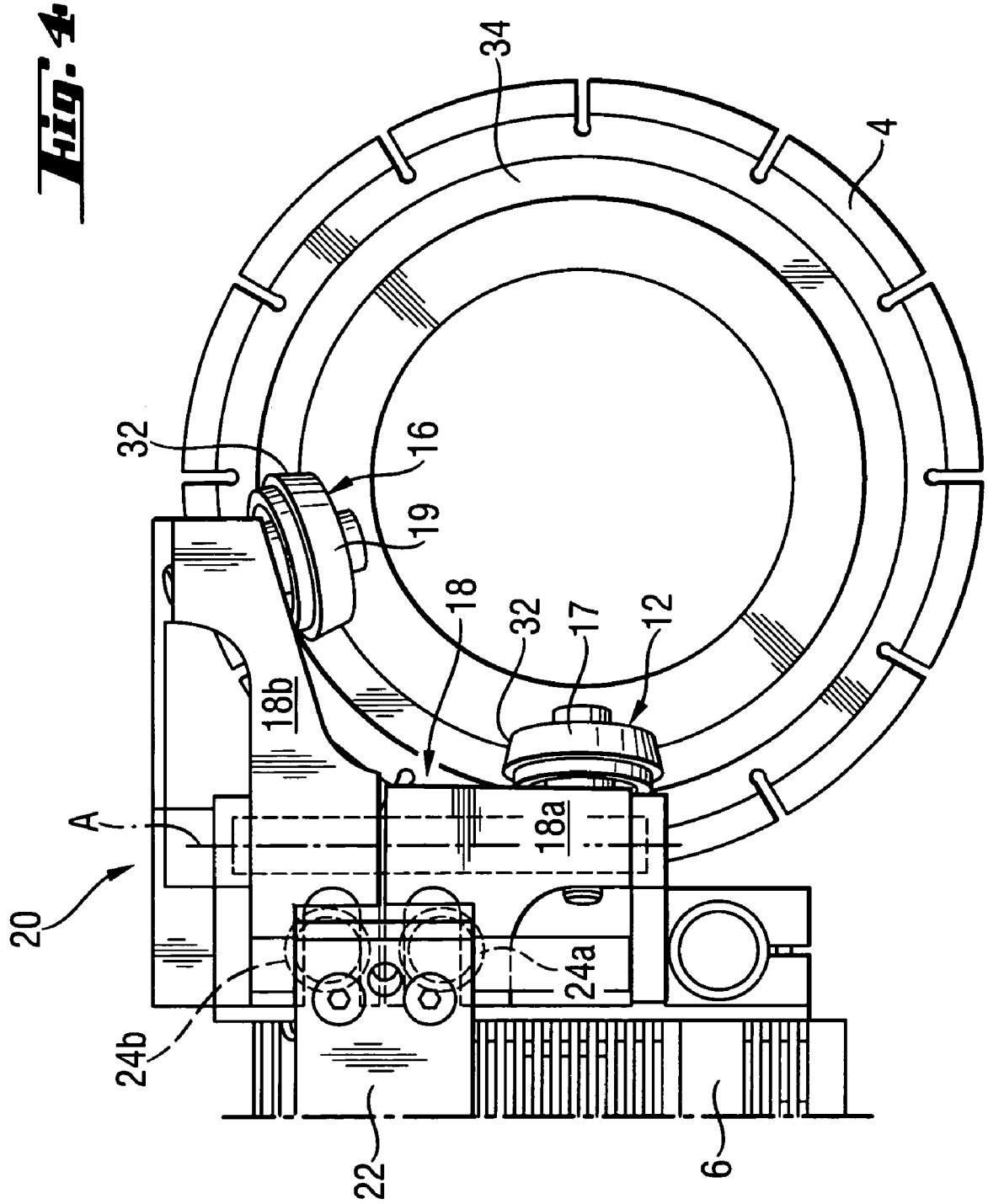
FIG. 4 a plan view of an alternative embodiment of a pivot device of a power tool according to the present invention.
Figure 5:
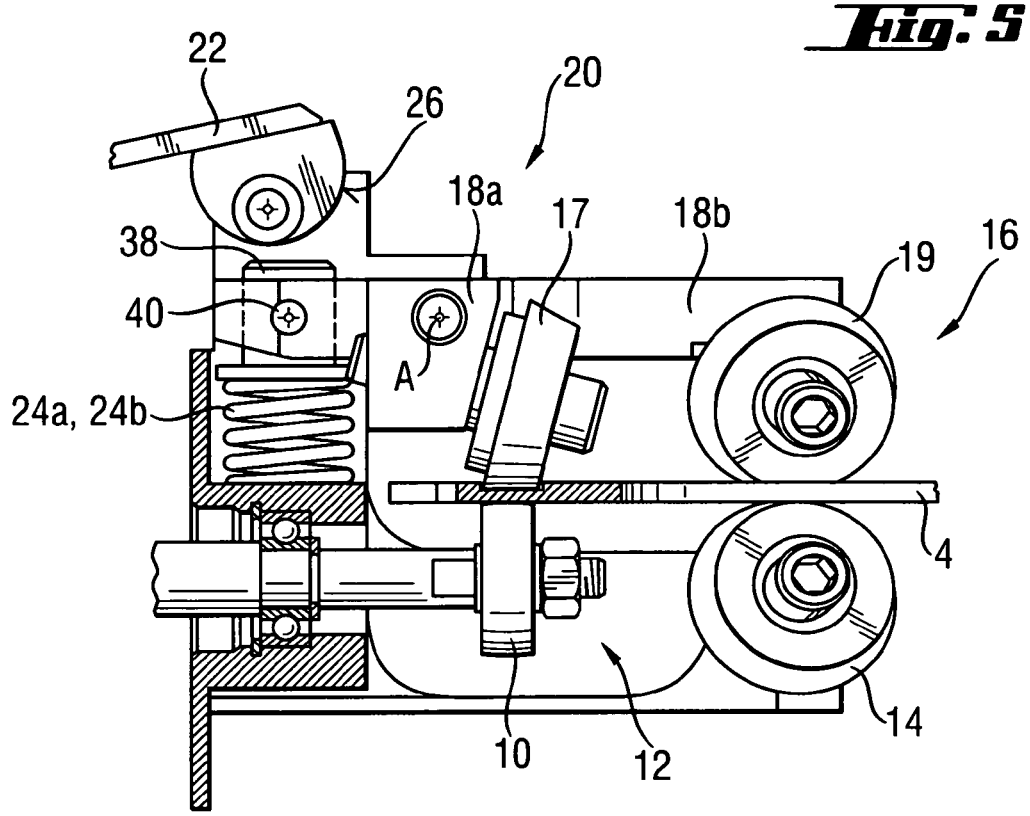
FIG. 5 a partially cross-sectional view of a pivot device of the power tool shown in FIG. 4 in a drive position.
Figure 6:
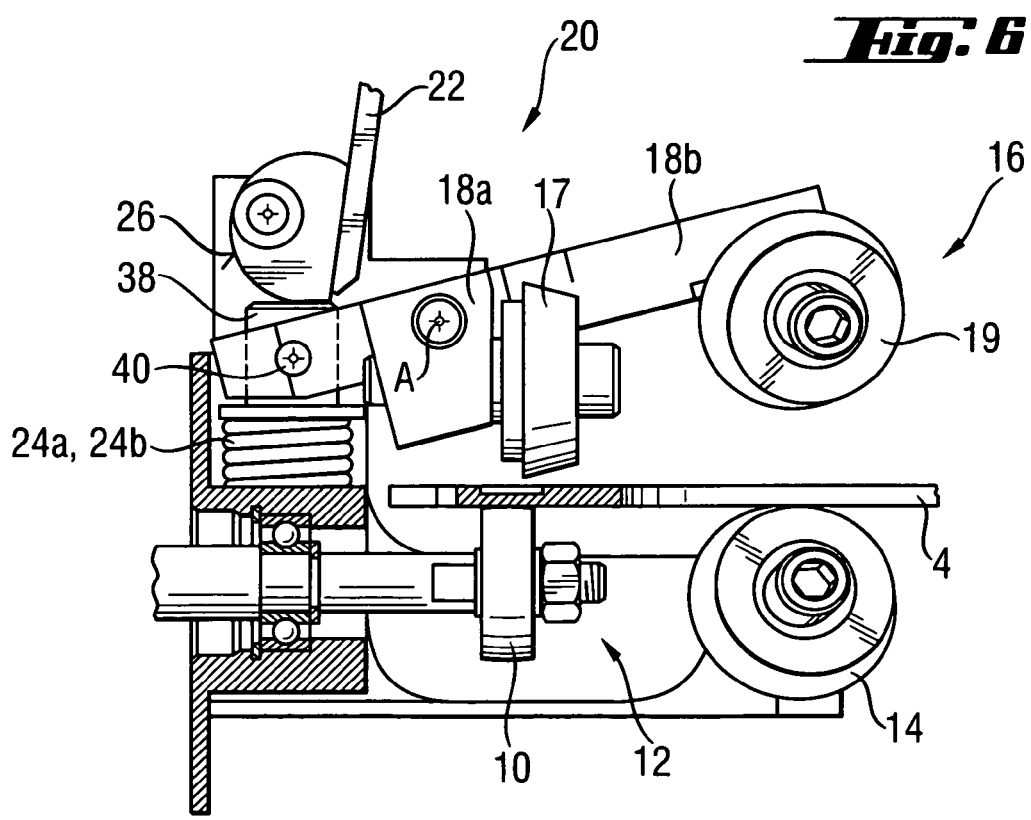
FIG. 6 a partially cross-sectional view of a pivot device of the power tool shown in FIG. 4 in a release position.

FIGS. 4–6 show an alternative embodiment of the pivot device 20, with the elements similar to those shown in FIGS. 1–3 being designated with the same reference numerals.

As can be seen in particular in FIG. 4, the main difference of the alternative embodiment of the pivot device 20 consists in that the support member 18 has spaced from each other, first (18a) and second (18b) support parts. Two spring elements, namely, a first spring element 24a and a second spring element 24b, both of which are formed as helical springs, engage, respectively, first (18a) and second (18b) support parts. For pivoting both support parts as in the embodiment of FIGS. 1–3, a single actuation element 22 is used.

A shown in FIGS. 5–6, in this embodiment of the pivot device 20, the radial cam 26 acts not directly on the contact surface 28 of the support member 18 but cooperates with two cogs 38 which are connectable by respective pivot supports 40 with the first support part 18a or the second support part 18b. In FIGS. 5–6, the cogs 38 of the first support part 18a are shown. In the view shown in FIGS. 5–6, the first support part 18a covers the cogs of the second support part 18b.

FIG. 5 shows the pivot device 20 in the drive position in which the radial cam 26 is spaced from the cogs 38 by a certain distance. The springs 24a, 24b bias, via respective cogs 28, the respective pivot supports 40, and the first support part 18a and the second support part 18b, respectively, the second guide roller 19 toward the first guide roller 14 and the second drive roller 17 toward the first drive roller 10. In this way, both the drive roller pair 12 and the guide roller pair 16 simultaneously apply pressure to the working tool 4 which is secured on the power tool 2 both radially and axially in a manner described above with reference to the embodiment of FIGS. 1–3.

With the two-part embodiment of the support member 18, the second drive roller 17 and the second guide roller 19 can be pivoted about the axis A by a different amount, which permits to compensate for different amount of wear of the roller pairs 12 and 16.

By pivoting the actuation element 22 the radial cam 26 is displaced downwardly, applying pressure to cogs 38. The cogs 38 pivot the support parts 18a, 18b against a biasing force of spring elements 24a, 24b, and opening, in a manner described above with reference to the embodiment of FIGS. 1–3, the drive roller pair 12 and the guide roller pair 16. The pivot device 20 is brought into its release position shown in FIG. 6, and the working tool 4 can be easily replaced.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A power tool for driving an eccentrically mounted rotatable working tool, comprising:
    a housing (6);
    a motor (8) located in the housing (8);
    a roller device (13) supported on the housing (6) and having at least two roller pairs (12, 16) each having a first roller (10, 14) and
    a second roller (17, 19) engageable with opposite sides of the working tool (4), with at least one of the rollers (10, 14, 17, 19) of at least one roller pair (12, 16) being rotatable by the motor for driving the working tool (4);
    a pivot device (20) for pivoting the first rollers (10, 14) jointly relative to the second rollers (17, 19) between a release position in which the working tool (4) is brought in or removed from the roller device (13), and a drive position in which a forcelocking connection between the at least one of the rollers (10) of the at least one roller pair (12, 16) and the working tool (4) is established,
    the pivot device (20) comprising means for preloading the roller pairs (12, 16) in the drive position thereof, the preloading means comprising separate spring elements (24*a*, 24*b*) for preloading the roller pairs (12, 16), respectively.

2. A power tool according to claim 1, wherein the pivot device (20) comprises actuation means (22) for bringing the roller pairs (12, 16) jointly into the release position thereof.

3. A power tool according to claim 2, comprising means for retaining the actuation means (22) in the release position.

4. A power tool according to claim 3, wherein the pivot device (20) comprises at least one support member (18; 18*a*, 18*b*) for supporting one of the first rollers (10, 14) and the second rollers (17, 19), and wherein the actuation means (22) is formed as an eccentric lever pivotally supported on the housing (6) and having a radial cam (26) engageable with the at least one support member (18; 18*a*, 18*b*).

5. A power tool according to claim 4, wherein the pivot device (20) comprises spring means for preloading the at least one support member (18; 18*a*, 18*b*) in the drive position, and an engagement cog (38) rotatably supported on the at least one support member (18; 18*a*, 18*b*) for displacing the spring means in a preloading position thereof and engageable by the radial cam (26).

* * * * *